United States Patent [19]

Searfoss, Jr.

[11] Patent Number: 5,252,211
[45] Date of Patent: Oct. 12, 1993

[54] COFFEE FILTER SUPPORT ASSEMBLY

[76] Inventor: Robert T. Searfoss, Jr., 6048 E. Searfoss Dr., Syracuse, Ind. 46567

[21] Appl. No.: 940,358

[22] Filed: Sep. 3, 1992

[51] Int. Cl.$^5$ .............................................. B01D 29/05
[52] U.S. Cl. .................................. 210/474; 210/478; 210/479
[58] Field of Search ............... 210/474, 477, 478, 479, 210/481

[56] References Cited

U.S. PATENT DOCUMENTS

| | | | |
|---|---|---|---|
| 526,331 | 9/1894 | Tobin | 210/478 |
| 1,986,957 | 1/1935 | Cargill | 210/480 |
| 2,133,178 | 10/1938 | Sieling | 210/480 |
| 4,656,932 | 4/1987 | Kopp | 210/474 |

Primary Examiner—Robert A. Dawson
Assistant Examiner—W. L. Millard
Attorney, Agent, or Firm—S. Michael Bender

[57] ABSTRACT

A support assembly for coffee filters comprises an annular or ring-like member adapted to nest inside the coffee filter basket of an automatic "drip" style coffee machine with the ring member being adapted to fit concentrically inside the circumference of the replaceable filter element in a manner to maintain the filter in engagement against the inside wall of the basket during the coffee brewing cycle. A portion of the ring member is tubular and flexible whereas another portion of the ring comprises a rod having its opposite ends received inside corresponding opposite ends of the tubular portion so that the rod portion may be telescopically displaced relative to the tubular portion. Resilient biasing means in the interior of the tubular portion tends to resist such relative telescopic displacement and urges the ring member to assume its normal diameter. Pressure exerted against the rod overcomes the resilient biasing force and causes it to slide within the tubular ring portion thereby reducing the overall diameter of the ring. The counterforce generated by the resilient biasing means causes the ring member to snugly engage the filter and urge it against the wall of the basket. By this construction, a one-size support assembly according to the present invention will fit most, if not all, sizes of coffee machine basket. In an alternatively preferred embodiment, a bracket assembly attached to the ring member centrally supports a coffee ingredient level indicator and a storage receptacle for additional brewing ingredients.

11 Claims, 4 Drawing Sheets

COFFEE FILTER SUPPORT ASSEMBLY

BACKGROUND OF THE INVENTION

1. Field of the Invention

The present invention relates generally to support assemblies, and more particularly to a support assembly for retaining a coffee filter against the inside wall of the coffee brewing basket in automatic drip coffee makers.

2. Description of the Prior Art

Devices for retaining the coffee filter against the wall surface of a basket in automatic drip coffee makers generally are well known. Such devices are designed to prevent a portion of the coffee filter from sagging away from the wall of the basket and allowing coffee grinds to fall between the basket and the filter and thence into the coffee pot.

For example, U.S. Pat. No. 4,656,932 discloses a contractible annular member disposed inside the filter and adapted to urge the filter against the wall of the coffee brewing basket. The inside diameter of the annular member may be altered by sliding one portion thereof relative to another. A series of clips frictionally engages the portions and maintains them in their adjusted position.

Similarly, U.S. Pat. No. 4,963,262 comprises a one-piece retainer ring sized and shaped to fit inside the coffee brewing basket so that the coffee filter is sandwiched between the wall of the basket and the retainer ring.

Other devices of this same general type are disclosed in U.S. Pat. No. 4,735,719 (a frusto-conical retainer ring with an annular flange at the top); U.S. Pat. No. 4,865,737 (a cylindrical structure of woven mesh sized to fit into baskets of different shape and size); and U.S. Pat. No. 4,981,588 (a support member adapted to supported on the rim of a cup and to support, in turn, a filter member extending into the cup).

Each of the above patented devices suffers from the disadvantage of not being "automatically" adjustable to fit varying sized coffee brewing baskets and maintaining a snug fit without undue attention. Although the prior annular member of the '932 patent is adjustable, it must be manually manipulated by trial and error before the right size for a particular basket is obtained. None of the other coffee filter support devices shown in the prior art discussed above includes means for automatically adjusting the fit of the coffee filter support assembly to accommodate the particular basket it is being employed with. This important disadvantage is overcome and other advantages are achieved only by the present invention as will be made apparent from a study of the remainder of the specification which follows.

SUMMARY OF THE INVENTION

The foregoing requirement of providing an improved automatically adjustable coffee filter support assembly and other advantages are achieved by the present invention which briefly described comprises an annular or ring-like member adapted to nest inside the coffee filter basket of an automatic "drip" style coffee machine with the ring member being adapted to fit concentrically inside the circumference of the replaceable filter element in a manner to maintain the filter in engagement against the inside wall of the basket during the coffee brewing cycle. A portion of the ring member is tubular and flexible whereas another portion of the ring comprises a rod having its opposite ends received inside corresponding opposite ends of the tubular portion so that the rod portion may be telescopically displaced relative to the tubular portion. Resilient biasing means in the interior of the tubular portion tends to resist such relative telescopic displacement and urges the ring member to assume its normal diameter. Pressure exerted against the rod overcomes the resilient biasing force and causes it to slide within the tubular ring portion thereby reducing the overall diameter of the ring. The counter-force generated by the resilient biasing means causes the ring member to snugly engage the filter and urge it against the wall of the basket. By this construction, a one-size support assembly according to the present invention will fit most, if not all, sizes of coffee machine basket. In an alternatively preferred embodiment, a bracket assembly attached to the ring member centrally supports a coffee ingredient level indicator and a storage receptacle for additional brewing ingredients.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will form the subject matter of the claims appended hereto.

In this respect, before explaining at least two preferred embodiments of the invention in detail, it is to be understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which this disclosure is based, may readily be utilized as a basic for designing other structures, methods, and systems for carrying out the several purposes of the present invention. It is important, therefore, that the claims be regarded as including such equivalent constructions insofar as they do not depart from the spirit and scope of the present invention.

Further, the purpose of the foregoing Abstract is to enable the U.S. Patent and Trademark Office and the public generally, and especially the scientists, engineers and practitioners in the art who are not familiar with patent or legal terms of phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

It is therefore an object of the present invention to provide a new and improved coffee filter support assembly which has all of the advantages of the prior art and none of the disadvantages.

It is another object of the present invention to provide a new and improved coffee filter support assembly which may be easily and efficiently manufactured and marketed.

It is a further objective of the present invention to provide a new and improved coffee filter support assembly which is of durable and reliable construction.

An even further object of the present invention is to provide a new and improved coffee filter support assembly which is susceptible of a low cost of manufacture with regard to both materials and labor, and which accordingly is then susceptible of low prices of sale to the consuming public, thereby making such coffee filter support assembly economically available to the buying public.

Still yet another object of the present invention is to provide a new and improved coffee filter support assembly which provides in the apparatuses and methods of the prior art some advantage thereof, while simultaneously overcoming some of the disadvantages normally associated therewith.

Still another object of the present invention is to provide a new and improved coffee filter support assembly automatically adjustable to fit virtually all sizes of coffee maker brewing basket.

It is yet still another object of the present invention to provide a new and improved coffee filter support assembly which further includes integral means for indicating the level of coffee grinds in the filter, and a storage means for additional ingredients.

These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and the above objects as well as objects other than those set forth above will become more apparent after a study of the following detailed description thereof. Such description makes reference to the annexed drawings wherein:

FIG. 2 is a perspective view in elevation of yet another prior art coffee filter support assembly.

DESCRIPTION OF THE PREFERRED EMBODIMENT

With reference now to the drawings, a new and improved coffee filter support assembly embodying the principles and concepts of the present invention will be described. However, before proceeding it might be helpful to briefly review the prior art coffee filter support assemblies.

Figure 1:
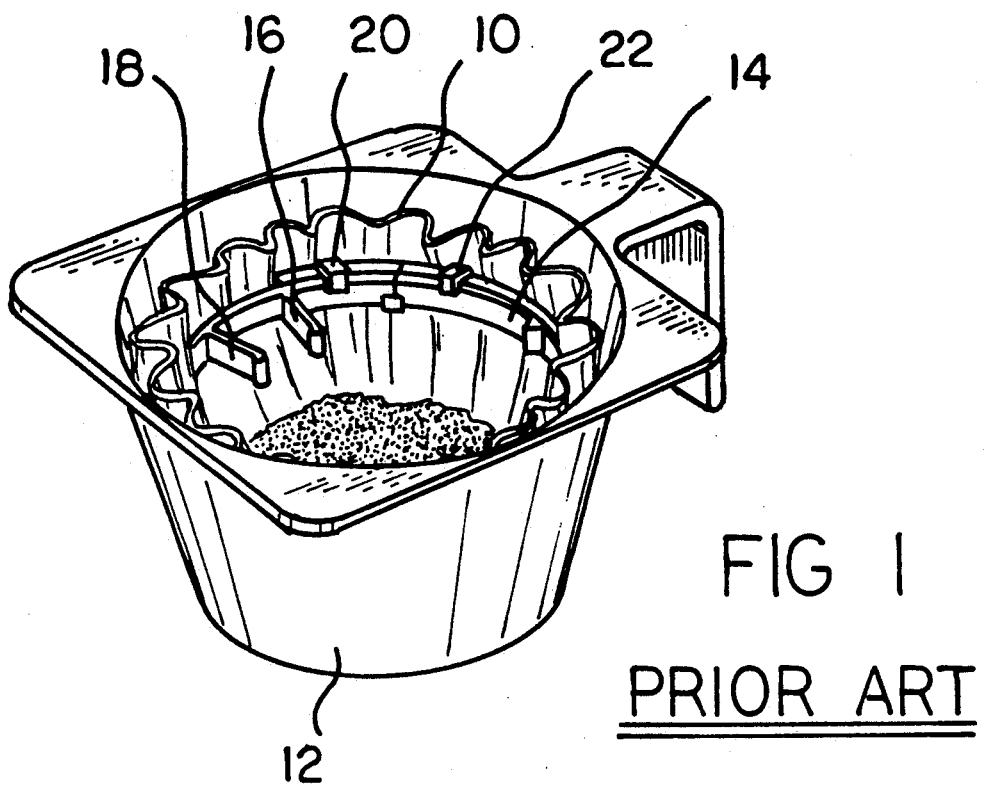
FIG. 1 is a perspective view in elevation of a prior art coffee filter support assembly.
Figure 1:
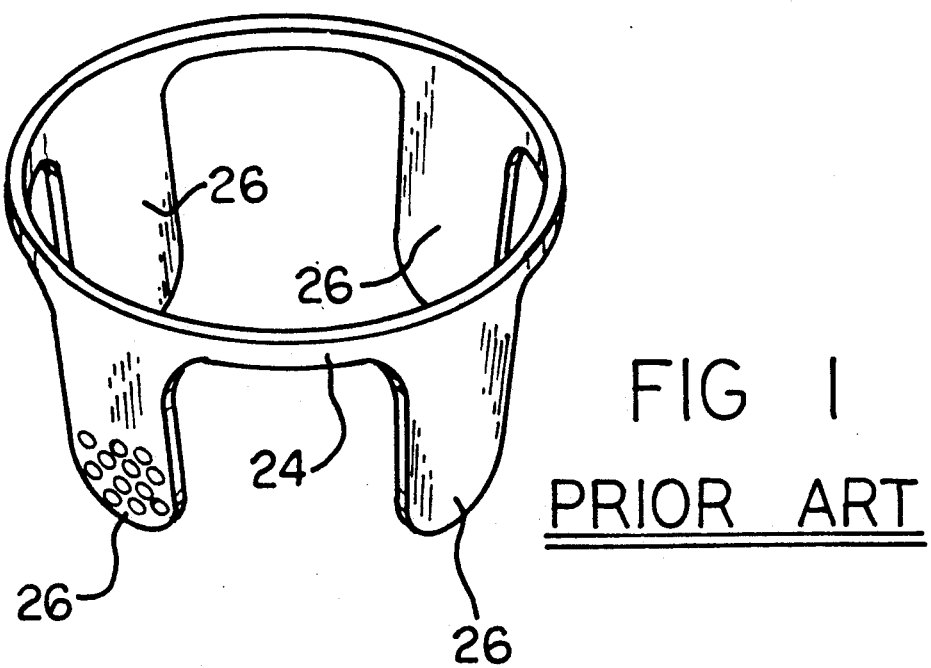

Turning to FIG. 1, there is shown a typical prior art coffee filter support assembly being used with a conventional coffee filter element 10 inside the coffee brewing basket 12 of a standard, commercially available automatic drip coffee maker. The filter support assembly is in the form of an annular member 14 concentrically nested within the filter in such a manner as to urge the filter against the inside wall of the basket so that the coffee grinds remain in the filter bottom and do not have the opportunity to fall between the filter and the wall of the basket to eventually migrate into the pot of coffee being brewed. A pair of tabs 16, 18 is provided each one of which being located near a corresponding end or terminus of the annular member, respectively, to enable slidable displacement of one end of the member relative to the other thereby permitting the diameter of the annular member to be adjusted to fit the circumferential extent of differently sized baskets. Once adjusted by manual manipulation of the tabs 16, 18, gripper elements 20, 22 maintain the annular member ends in their adjusted relative position via frictional engagement therewith. It will be appreciated that several adjustments of tabs 16, 18 may be necessary to satisfactorily adjust the annular member for a given basket; that is, obtain the correct diameter of the adjusted member sufficient to snugly retain the rim of the filter element 10 at a suitable height above the filter element bottom.

Turning to FIG. 2, there is shown another prior art coffee filter support member in the form of a one-piece ring member 24 having a series of spaced, integral legs 26 downwardly depending therefrom. The annular member is merely placed concentrically within the filter element and supported therein by its leg members. This form of one-piece filter retainer must be sized to fit a coffee maker of complimentary size, i.e. it is not adjustable.

Figure 3:
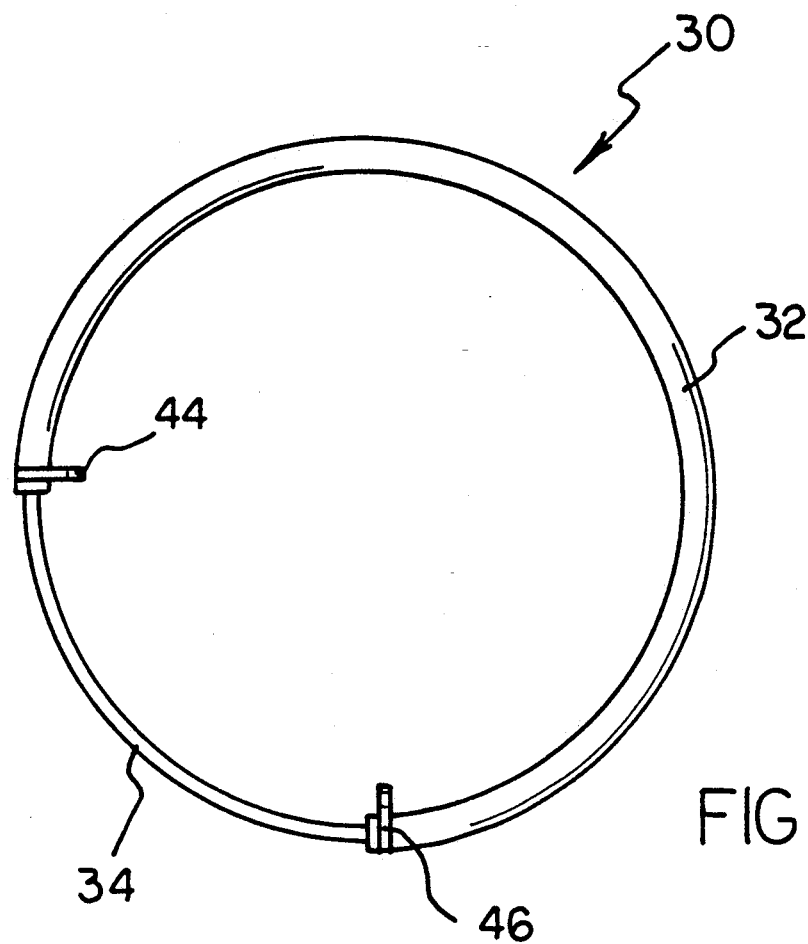
FIG. 3 is a plan view showing the first preferred embodiment of the invention.
Figure 4:
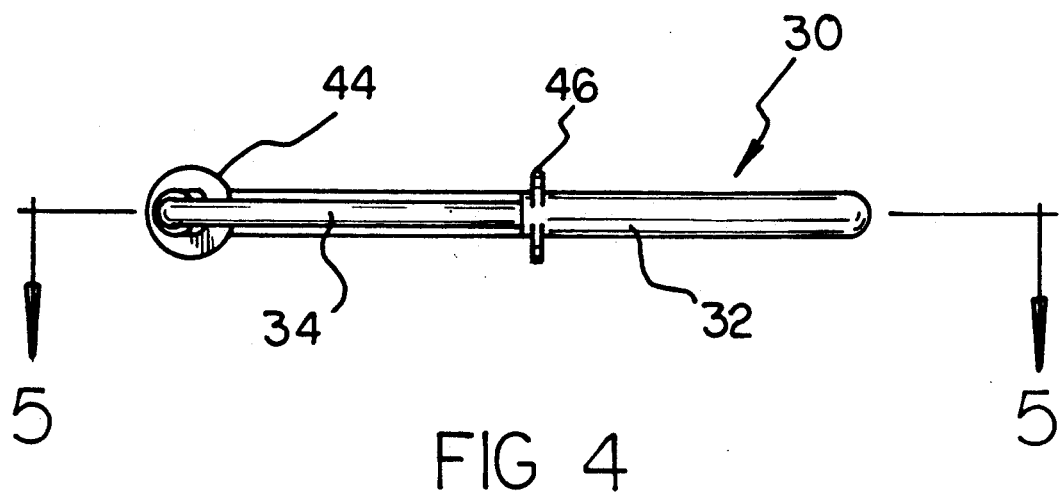
FIG. 4 is an elevational view of the embodiment of FIG. 3.
Figure 5:
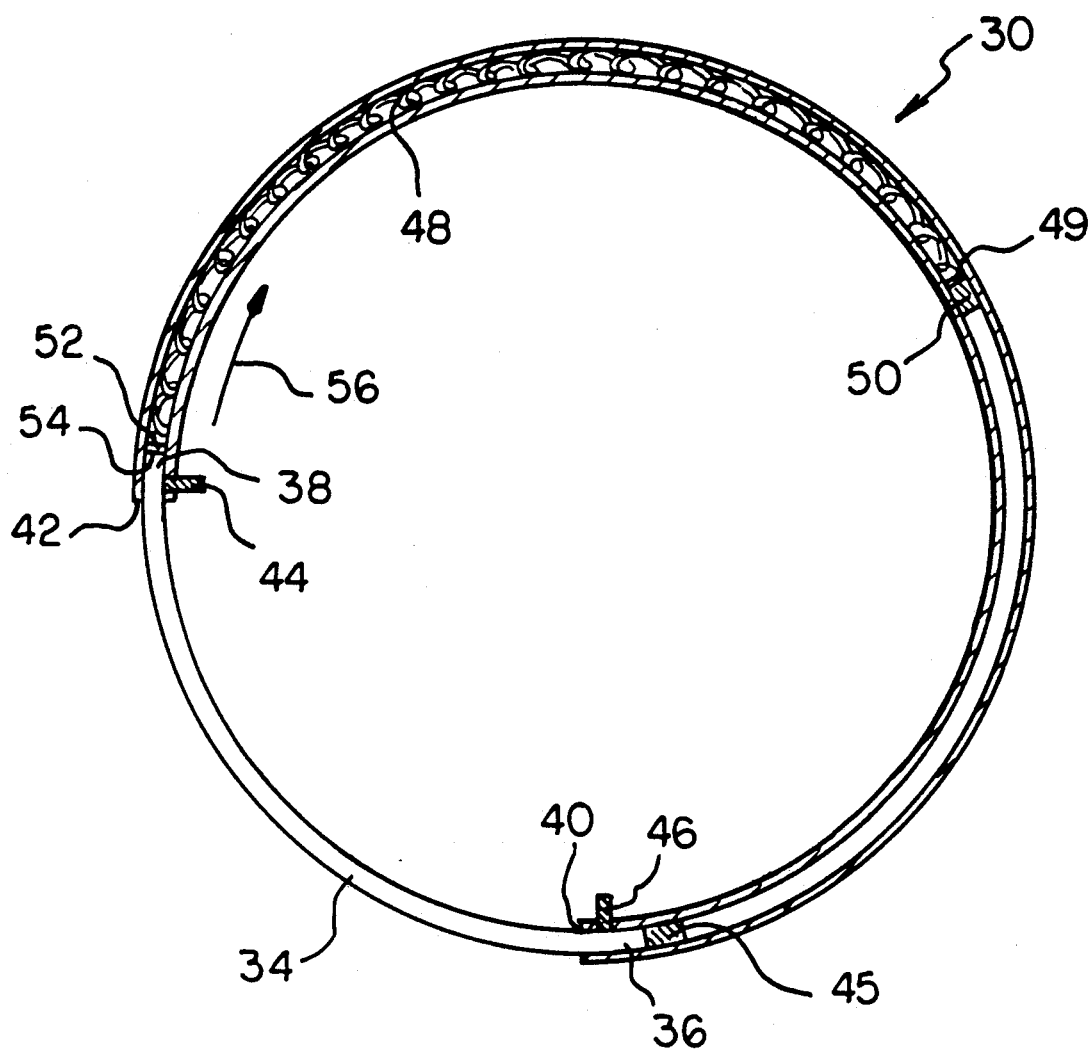
FIG. 5 is a cross-sectional plan view of the first preferred embodiment of the invention taken along line 5—5 of FIG. 4.

Turning now to FIGS. 3-5, the first preferred embodiment of the invention will be described. The improved coffee filter support assembly of the present invention is in the form of an annular, ring-like member generally designated by reference numeral 30. Annular member 30 comprises a first tubular portion 32 and a second portion preferably in the form of a solid cylindrical rod 34 whose oppositely facing ends 36, 38 are telescopically received respectively in the oppositely facing extremities 40, 42 of tubular portion 32 substantially as shown in FIG. 5. It will be observed that each portion is in the form of an arcuate segment with tubular portion 32 having a circumferential extent of approximately ⅜ths of a circle and second portion 34 having a circumferential extent of approximately ¼th of a circle.

In accordance with the invention, rod end 36 is fixedly secured to tubular portion 32 proximal to extremity 40 by means of a bushing 45 suitably fixed to rod end 36 and cemented or otherwise fixed in place within the bore or interior of tubular portion 32 as shown whereas rod end 38 is free and therefor adapted for slidable displacement within the bore or interior of corresponding tubular portion extremity 42. Proximal to extremity 42 and suitably fixed to the circumferential exterior of tubular portion 32 is a finger plate or tab 44 of generally circular shape substantially as shown (see FIG. 5) the central axis of which is offset inwardly and radially with respect to the central axis of the annular member 30 so that there is a smooth surface on the outside curved edge of the support assembly and the finger tab 44 extends radially inwardly toward the central axis of the support assembly.

A similar finger plate or tab 46 is suitably fixedly attached to the circumferential exterior of tubular portion 32 near opening 40 substantially as shown. The purpose of finger tabs 44, 46 is to facilitate a selective decrease of the inside diameter of the annular support assembly; that is, by causing the finger tabs 44, 46 to displace circumferentially toward each other from their normal positions shown in the drawings, the free end 38 of rod portion may be telescopically slidably displaced within the bore or interior of tubular portion 32 thereby concentrically decreasing the size of the coffee filter support assembly of the invention and readily permitting it to be emplaced within the opening of a coffee filter and brewing basket.

In accordance with another important feature of the invention, and as best seen in FIG. 5, there is disposed within approximately one-half of the cavity defined by the interior of tubular portion 32, a resilient biasing means in the form of a spiral compression spring 48. One end 49 of spring 48 is suitably attached to a fixed interior partition 50 located approximately midway along the circumferential extent of tubular portion 32 whereas the other or distal end 52 of spring 48 terminates in a piston 54 adapted to abuttingly engage end 38 of rod portion 34. Spring 48 normally maintains the rod relative to the tubular portion in the position substantially as shown in FIGS. 3-5 which depict an annular member slightly larger than the inside diameter of a standard coffee maker brewing basket.

When it is desired to place the annular member 30 in a concentric nesting position inside a coffee filter element once the latter has been seated in the basket, and prior to charging it with coffee grinds, a circumferential pressure is applied to finger tabs 44 and 46 to cause them to displace toward each other. This action causes the rod portion free end 38 to slide telescopically in the direction of arrow 56 within the interior of tubular portion 32 against the resilient bias or resistance produced by the engagement of the rod end against piston 54 and compression of spring 48. The counter-force created by the compression of spring 48, in turn, urges the rod 34 to return to its original position and in so doing causes the annular member to exert a radially outwardly directed force relative to the center of the annular member sufficient to seat and retain the member snugly and securely against the coffee filter in the basket. The coffee filter rim thus is urged against the basket sidewall as the annular member portions 32, 34 automatically adjust to the diameter of the basket thereby effectively retaining the filter in place along its entire circumferential extent.

It will be noted that the tubular portion 32 and the rod portion 34 are fabricated of a suitable material so that they will flex slightly upon slidable movement relative to each other, be impervious to the effects of hot water, and avoid contamination of the coffee being brewed. Aluminum has been found to meet these requirements and is the mostly preferred material; however, a variety of suitable plastic materials may be used instead, if desired, as will occur to those of ordinary skill in the art.

From the above, it is apparent that the improved filter support assembly of the present invention, by virtue of the arrangement of parts described above, is capable of automatically assuming an outside diameter or dimension capable of effectively circumferentially retaining a standard coffee filter element against the sidewall of the basket notwithstanding differences in the size (diameter) of various brewing baskets offered in different brands of coffee making machines. Hence, according to the invention, a one-size coffee filter support assembly is provided capable of automatically adapting to fit all sizes of baskets. Moreover, because of its self-adjusting feature, it is a simple matter to locate annular member 30 at any height within the filter basket thus further facilitating convenient handling during its intended use. One merely squeezes the finger tabs 44, 46 toward each other as described above, places the annular member in the desired position within the basket to form a sandwich with the filter element, and then releases the finger plate tabs allowing the annular support assembly to automatically snap into place thereby securely urging the filter element against the wall of the basket. The coffee maker may then be operated in the usual manner, i.e. the coffee grinds are dispensed into the filter which because it is being retained against the wall of the basket along its entire circumferential extent makes it virtually impossible for any coffee grinds to fall between the filter element and the basket and eventually form an undesirable residue in the pot of coffee being brewed.

Figure 6:
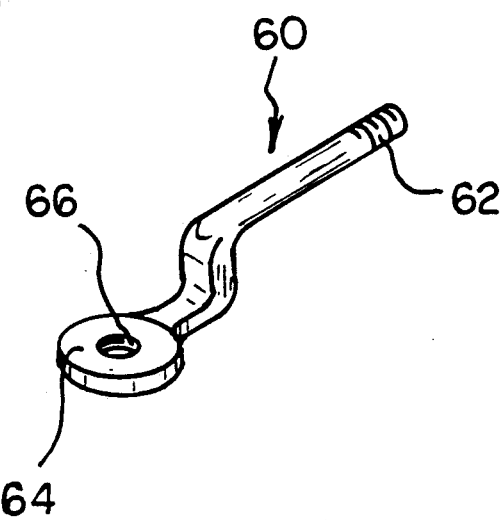
FIG. 6 is a perspective view of a portion of the second preferred embodiment of the invention.
Figure 7:
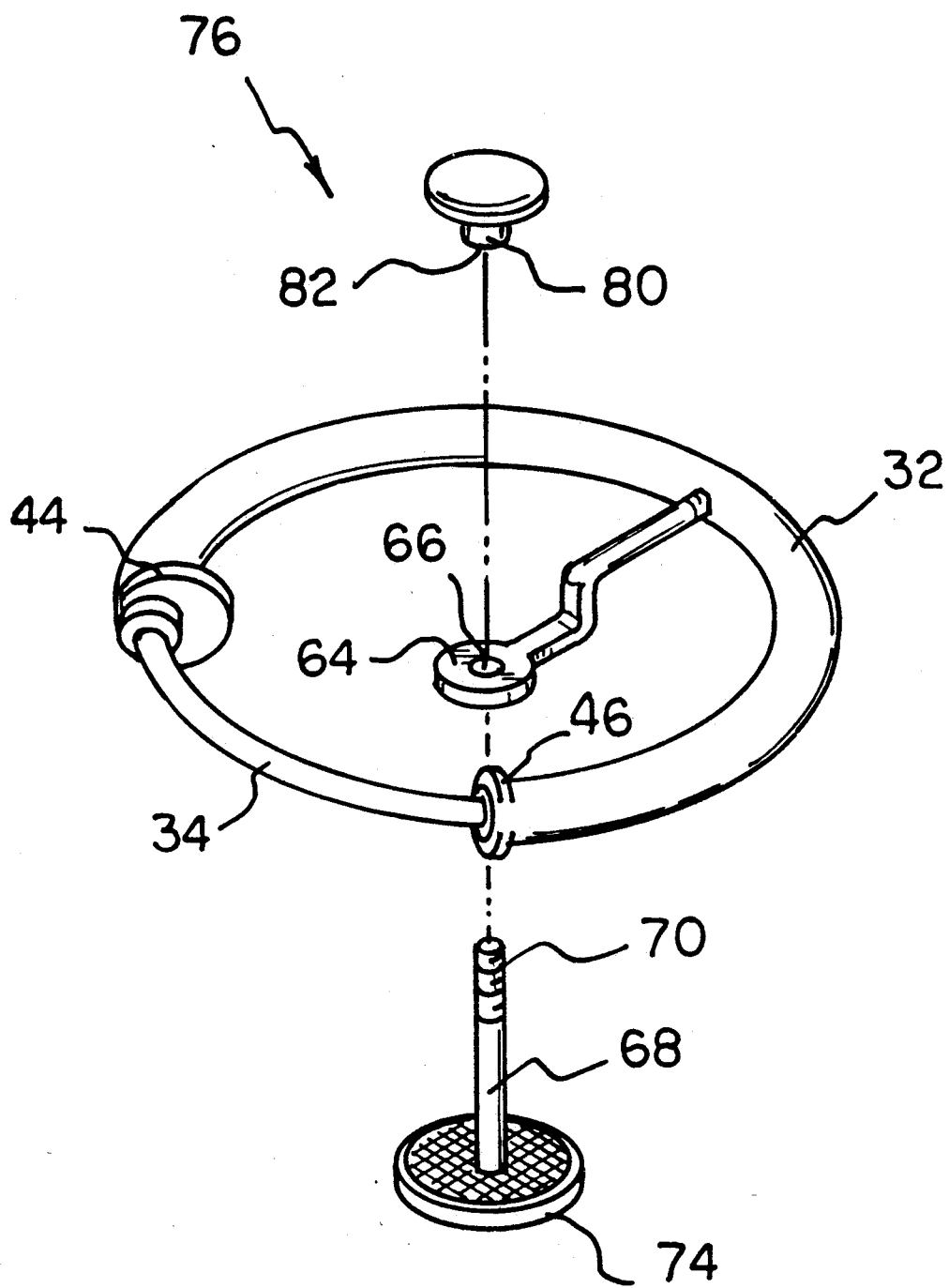
FIG. 7 is a perspective view in elevation of the alternatively preferred embodiment of the invention showing the bracket assembly which is attached to the annular member in exploded assembly format.

Turning now to FIGS. 6 and 7, there is shown an alternatively preferred embodiment of the invention wherein like parts are represented by like reference numerals. In this alternative exemplary embodiment, a cantilevered bracket is provided suitably attached to the annular retainer member for mounting a receptacle and a coffee grind level indicator coaxially with respect to the annular member. The bracket member (FIG. 6) is generally represented by reference numeral 60 and has an externally threaded end 62 adapted to cooperatively engage a suitable female threaded recess (not shown) in the wall of tubular portion 32 in the region of the tubular portion not occupied by spring 48 (e.g. slightly to the right of partition 50 as viewed in FIG. 5). The central portion of bracket 60 preferably is stepped down by virtue of a pair of right angle bends substantially as shown, and has its other distal end terminating in an eyelet 64. The central opening 66 defining eyelet 64 is tapped thereby providing it with a female threaded fastening surface. A stud bolt 68 having an externally threaded end 70 is adapted to be screw fastened into the tapped opening 66 and thus retained by bracket 60 in generally coaxial alignment with the imaginary central axis of the retainer member 30 when the bracket is, in turn, screw fastened into the side wall of tubular portion 32. The bottom or distal end of stud bolt 68 terminates in a wire mesh disc 74 suitably attached thereto substantially as depicted in FIG. 7, i.e. generally parallel to the plane of retainer member 30. A cap member generally represented by reference numeral 76 having a shallow, dished (concave) upwardly facing surface sufficient to define a shallow receptacle is integrally attached to a bushing 80 having a female threaded recess (not shown) formed in its free end 82. Hence, when stud bolt 68 is rotated into engagement with eyelet via the coaction of its threaded end into and through the tapped recess 66 in eyelet 64, the receptacle and its integral bushing may be screw fastened atop the threaded end of the stud bolt. It will be appreciated that upon further rotation of the stud bolt relative to the bracket member's eyelet portion 64, the vertical distance (as viewed in FIG. 7) between the mesh disc and the bracket member (and therefore the annular member) may be selectively adjusted. In this manner, the mesh disc may be employed to indicate a desired level of coffee grinds dispensed into the coffee filter when the retainer member is in place concentrically nested within the basket of the coffee making machine. In other words, the filter may be filled with coffee grinds to the level of the mesh disc.

Moreover, additional ingredients to be added to and brewed with the coffee may be placed in the dished receptacle 76, such ingredients including for example, ground cinnamon, coffee grinds of a different flavor, salt, and so on.

It is thus seen, that the alternative embodiment of FIGS. 6 and 7 not only incorporates all of the advantages of the exemplary embodiment of FIGS. 3-6, but further, provides additional means for indicating the level of the coffee to be placed in the filter and for providing a convenient receptacle for other ingredients to be blended with the coffee reposing in the filter element being retained by annular member 30.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all relationships equivalent to those illustrated in the drawings and described in the specification are intended to be encompassed by the present invention. While the present invention has been shown in the drawings and fully described above with particularity and detail in connection with what is presently deemed to be the most practical and preferred embodiment(s) of the invention, it will be apparent to those of ordinary skill in the art that many modifications there of may be made without departing from the principles and concepts set forth herein. Hence, the proper scope of the present invention should be determined only by the broadest interpretation of the appended claims so as encompass all such modifications and equivalents.

What is claimed as being new and desired to be protected by Letters Patent of the United States is as follows:

1. A new and improved apparatus for supporting a coffee filter in the basket of an automatic coffee maker comprising:
    an annular member, said annular member comprising first and second portions, said first portion being displaceable with respect to said second portion to reduce the transverse dimension of said annular member, and
    resilient biasing means interposed between said first and second portions for urging said portions to return to their initial positions relative to each other prior to said relative displacement whereby positioning of said annular member concentrically within said filter after said displacement is effective to retain said filter against the inside wall of said basket,
    wherein said first portion includes a tubular member and said second portion is adapted to telescopically displace relative to said first portion by slidable movement within at least a first portion of said tubular member.

2. The invention of claim 1 wherein said resilient biasing means is located in said at least first portion of said tubular member, said second portion of said annular member has a pair of opposed ends, and one of said ends engages said resilient biasing means whereas the other of said ends is telescopically received within a second portion of said tubular member.

3. The invention of claim 2 further comprising a longitudinally extending bracket having opposed ends, one end of said bracket being attached to said second portion of said tubular member so that the other end of said bracket extends radially toward the central axis of said annular member, said bracket other end carrying means for indicating the level of coffee grinds dispensed into said filter.

4. The invention of claim 3 wherein said coffee level indicating means comprises a bolt having a longitudinal axis attached to said bracket other end, said bolt axis being aligned to said annular member's central axis wherein the opposite ends of said bolt extend perpendicular to said bracket, one of said bolt ends being located above said bracket and the other of said bolt ends being located below said bracket, and said indicator means being carried by said other bolt end to indicate the level of coffee in said filter.

5. The invention of claim 4 further comprising means for storing additional ingredients comprising concave means, said concave means being carried by said one bolt end to support said additional ingredients.

6. The invention of claim 5 wherein said coffee level indicator means comprises a disk attached to said other end of said bolt, said disc being parallel to the plane of said annular member.

7. The invention of claim 2 wherein said other end of said second portion telescopically received within a second portion of said tubular member is fixed to said second portion of said tubular member.

8. The invention of claim 4 wherein said bolt is attached to said bracket through a threaded recess in said bracket's other end and said bolt is adjustable by rotating said bolt in said threaded recess whereby the level of said indicator means may be raised or lowered relative to said bracket and said annular member.

9. The invention of claim 1 wherein said resilient biasing means comprises a compression spring located in said first portion of said tubular member, one end of said spring being connected to said tubular member, the other end of said spring engaging said one end of said second portion of said annular member.

10. The invention of claim 9 wherein said first and second portions of said annular member are in the shape of arcuate segments respectively, the circumferential extent of said arcuate segment corresponding to said first portion being greater than the circumferential extent of said arcuate segment corresponding to said second portion.

11. The invention of claim 10 wherein the circumferential extent of said arcuate segment corresponding to said first portion of said annular member is approximately ¾ths of a circle and the circumferential extent of the arcuate segment corresponding to said second portion of said annular member is approximately ¼th of a circle.

* * * * *